US012367592B2

(12) United States Patent
Kabkab et al.

(10) Patent No.: US 12,367,592 B2
(45) Date of Patent: Jul. 22, 2025

(54) OBJECT LABELING FOR THREE-DIMENSIONAL DATA

(71) Applicant: Waymo LLC, Mountain View, CA (US)

(72) Inventors: Maya Kabkab, Palo Alto, CA (US); Yulai Shen, Sunnyvale, CA (US); Congyu Gao, Palo Alto, CA (US); Sakshi Madan, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 483 days.

(21) Appl. No.: 17/748,460

(22) Filed: May 19, 2022

(65) Prior Publication Data

US 2023/0377164 A1    Nov. 23, 2023

(51) Int. Cl.
| | |
|---|---|
| *G06K 9/00* | (2022.01) |
| *G06T 7/187* | (2017.01) |
| *G06T 7/50* | (2017.01) |
| *G06V 10/25* | (2022.01) |
| *G06V 20/64* | (2022.01) |

(52) U.S. Cl.
CPC ............... *G06T 7/187* (2017.01); *G06T 7/50* (2017.01); *G06V 10/25* (2022.01); *G06V 20/647* (2022.01); *G06T 2207/10028* (2013.01)

(58) Field of Classification Search
CPC . G06T 2207/10028; G06T 7/187; G06T 7/50; G06V 10/25; G06V 10/255; G06V 10/40; G06V 10/44; G06V 20/70; G06V 20/60; G06V 20/80; G06V 2201/07; G06V 2201/08; G06V 2201/12; G06V 10/774; G06V 20/56; G06V 20/59; G06V 20/50; G06V 20/52; G06V 20/58; G06V 20/582; G06V 20/584; G06V 20/586; G06V 20/588; G06V 20/647; G06V 20/64
See application file for complete search history.

(56) References Cited

U.S. PATENT DOCUMENTS

| | | | |
|---|---|---|---|
| 11,062,454 B1 * | 7/2021 | Cohen | G01S 7/417 |
| 11,527,084 B2 * | 12/2022 | Taghavi | G06V 10/25 |
| 2006/0008119 A1 * | 1/2006 | Chang | G06T 7/74 |
| | | | 382/103 |

(Continued)

OTHER PUBLICATIONS

Lahoud, Jean, and Bernard Ghanem. "2d-driven 3d object detection in rgb-d images." Proceedings of the IEEE international conference on computer vision. 2017. (Year: 2017).*

*Primary Examiner* — Avinash Yentrapati
(74) *Attorney, Agent, or Firm* — Fish & Richardson P.C.

(57) ABSTRACT

Methods, computer systems, and apparatus, including computer programs encoded on computer storage media, for generating label data for one or more target objects in an environment. The system obtains first data characterizing the environment, wherein the first data includes position data characterizing a position of the target object. The system obtains second data including one or more three-dimensional (3D) frames characterizing the environment. The system determines, based on the first data, a guide feature for locating the target object in the 3D frames of the second data. The system receives a first user input that specifies at least an object position in the selected 3D frame, and generates label data for the target object based on the first user input.

20 Claims, 5 Drawing Sheets

(56) References Cited

U.S. PATENT DOCUMENTS

| | | | |
|---|---|---|---|
| 2019/0197196 A1* | 6/2019 | Yang | G06F 30/00 |
| 2022/0067689 A1* | 3/2022 | Guack | G06T 7/251 |
| 2022/0122324 A1* | 4/2022 | Jian | G06T 17/00 |
| 2023/0213643 A1* | 7/2023 | Hwang | G06T 7/50 |
| | | | 382/106 |
| 2023/0215044 A1* | 7/2023 | Sham | G06V 20/56 |
| | | | 382/103 |

* cited by examiner

OBJECT LABELING FOR THREE-DIMENSIONAL DATA

BACKGROUND

This specification generally relates to generating and modifying object labels for image data.

Labeling objects in image data is required for many tasks, such as robotic control, autonomous vehicle motion planning, and so on.

However, training and testing machine learning models to effectively detect and characterize objects in an environment require large-scale datasets of sensor data and corresponding object track labels.

BRIEF DESCRIPTION OF THE DRAWINGS

Like reference numbers and designations in the various drawings indicate like elements.

DETAILED DESCRIPTION

Figure 1:
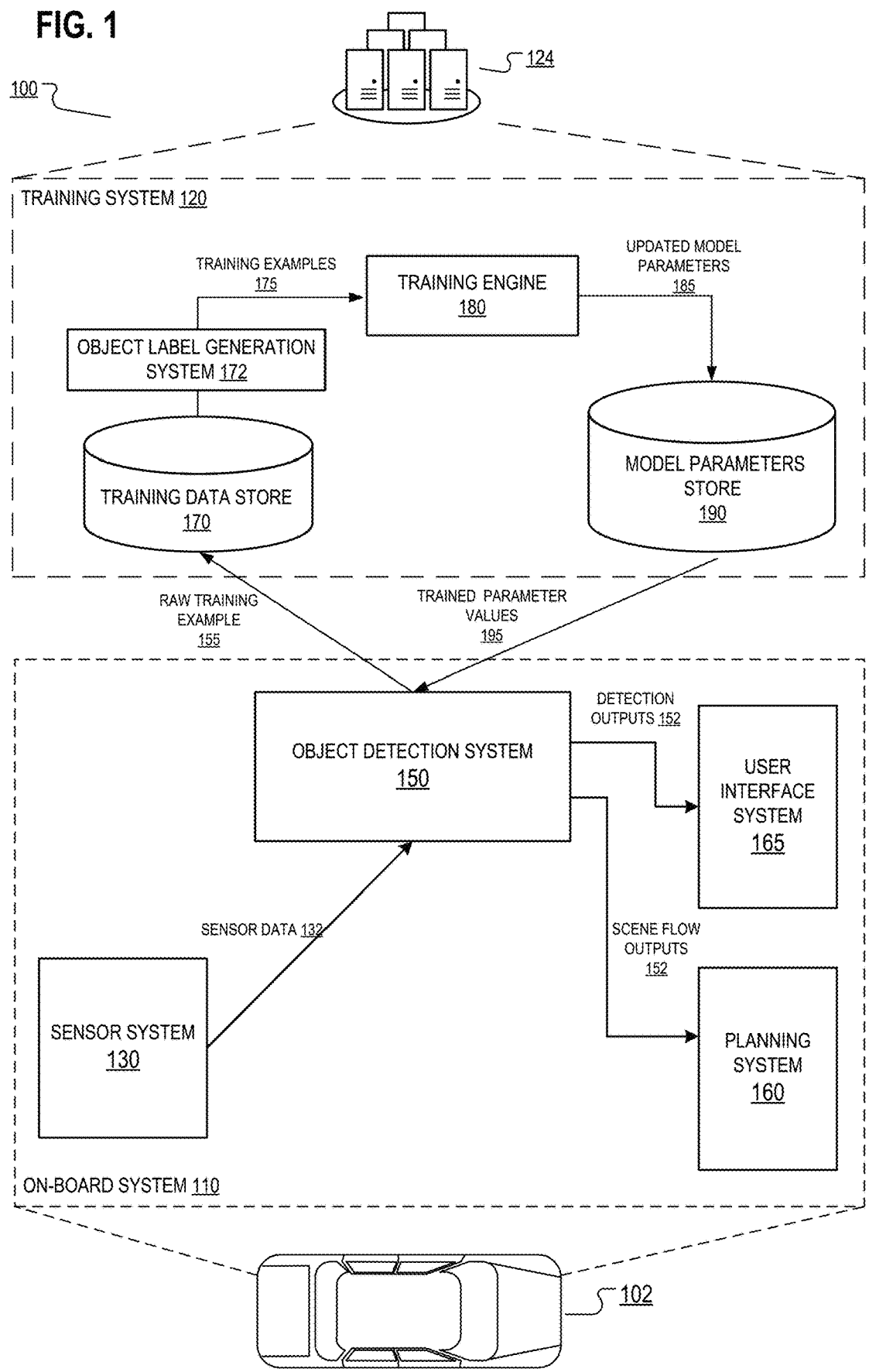
FIG. 1 shows an example system.

Machine learning models designed to automatically recognize and characterize objects in an environment from image data are critical in many applications, such as robotic control and autonomous vehicle motion control and planning. Training and testing these machine learning models requires training examples of sensor data and corresponding object labels. For example, large-scale datasets of image sensor data and high-quality annotations of the objects depicted in the image sensor data are crucial for training object detectors and classifiers in autonomous driving research and development.

Labels for annotating target objects in two-dimensional (2D) image data of the environment, such as camera data, typically specify the 2D positions and geometries of the target objects in the 2D image plane. In this specification, a target object refers to an object to be detected and/or identified in an environment. For example, the target object can be a vehicle or a part of the vehicle (e.g., a door or a wheel of the vehicle), a pedestrian, a cyclist, a road sign, a traffic signal, and so on, to be detected in a street scene.

For example, a traffic or road sign can be labeled by a bounding box, a contour, or a set of key points, in a 2D camera image. These labels typically do not provide full three-dimensional (3D) position information of the target objects. For example, when the traffic sign is labeled by a bounding box in a camera image, it is difficult to determine the distance of the traffic sign and the facing direction of the traffic sign from the camera image alone.

On the other hand, three-dimensional (3D) point clouds, e.g., obtained by a Lidar sensor, can provide full 3D position information for the target objects. However, manually annotating 3D sensor data can be time-consuming and expensive.

This specification provides a system and associated methods for improving the efficiency of generating object labels characterizing 3D position information of target objects from multiple data sources, including, for example, from both 2D camera images and 3D point clouds.

In one aspect of the specification, a method is provided for labeling a target object in an environment. The method can be implemented by a system of one or more computers located in one or more locations.

The system obtains first data characterizing the environment. The first data includes position data characterizing a position of the target object. For example, the first data includes a 2D camera image of the environment with a bounding box that marks the position and geometry of the target object in the 2D camera image. The 2D camera image and the bounding box characterize the position of the target object but only provide its position information in the two dimensions of the camera image plane. In another example, the first data includes a map of the environment and the position coordinates or other position identifiers for the target object.

The system further obtains second data that includes one or more 3D frames characterizing 3D spatial features in the environment. For example, the 3D frame can be a 3D point cloud captured at a particular time point by a Lidar sensor of the environment. In another example, the 3D frame can be a 3D image reconstructed from radar measurement. The second data can include a sequence of 3D frames captured at a plurality of time points.

In order to guide a user to navigate the 3D frame to locate the target object in the 3D frame, the system determines, based on the first data, a guide feature for localizing the target object. For example, when the first data is a 2D camera image with a bounding box that marks the position and geometry of the target object, the system can identify a center point of the target object in the 2D camera image plane. The identified center point in the 2D plane corresponds to a ray in the 3D space of the 3D frame, where any point on the ray corresponds to the position of the center point in the 2D plane. The system can determine the corresponding ray in the 3D frame based on the identified center point in the 2D plane and sensor pose and location data that characterizes the relative locations and poses of the camera and 3D sensor (e.g., a Lidar) that captures the second data.

The system displays, via a user interface including a display device, a rendering of at least a portion of a selected 3D frame in the second data.

In this specification, a rendering can refer to data generated for displaying 3D features using 2D computer display.

The system further displays a rendering of the guide feature (e.g., a ray) as an overlay on the rendering of the selected 3D frame. The guide feature can mark the possible 3D locations (e.g., possible 3D location of the object center point) of the target object. The displayed guide feature assists a user to navigate the 3D frame to locate the target object in the 3D frame.

After displaying the 3D frame and the guiding feature, the system receives a user input that specifies at least an object position in the 3D frame. For example, the user can select, via the user interface and based on the displayed 3D spatial features of the 3D frame, a point along or near the displayed rendering of the guiding feature (e.g., a ray). The point corresponds to a position in the 3D frame, e.g., the position of the 3D center point of the target object in the 3D frame as identified by the user. In some implementations, the user input can further specify an object direction of the target object in the selected 3D frame. The object direction can be a heading direction (e.g., of a vehicle or a wheel of a vehicle) or a facing direction (e.g., of a road sign) that characterizes an orientation of the target object.

Based on the user input, e.g., based on the object position and the object direction specified by the user input, the system generates label data for the target object. In an example implementation, the label data can include a depth value characterizing a distance of the target object determined from the object position and an angle value (e.g., an angle from a true north direction) of the target direction (e.g., heading or facing direction of the target). The generated label data can supplement the position data included in the first data (e.g., the 2D bounding box in the 2D image) and provide 3D position information of the target object.

In some implementations, the system further uses the first data to guide the generation and display of the rendering of the 3D frame. For example, before displaying the rendering of the portion of the 3D frame, the system can determine a 3D spatial range of interest for the 3D frame based on a field of view of the 2D image or the position data (e.g., an area that encompasses the bounding box of the target object in the 2D image), and only generate the rendering for the portion of the selected 3D frame that is within the 3D spatial range of interest.

In general, the described system and associated methods provide a solution for efficiently generating object labels based on user inputs and multiple data sources including 3D sensor dataset. The object labels generated by the described techniques provide 3D localization information of the objects, including, for example, the depth and heading (or facing) directions of the target objects, which can be important for understanding the scene and guiding or controlling an agent to navigate through or interact with the environment.

In conventional labeling approaches, when both 2D dataset (e.g., camera images) and 3D dataset (e.g., point cloud data) are available for the same scene, the labeling operators are required to independently label the target objects in both datasets. It takes additional complex processing to associate the 2D labels with the 3D labels due to the independent labeling processes. Further, a conventional 3D labeling process can be very resource and labor-intensive, since the operator needs to navigate through the renderings of an often large 3D image dataset and localize the target object in all three dimensions.

The techniques provided by this specification overcome certain drawbacks of the conventional labeling process. In one aspect, instead of directly performing the labeling process on the 3D dataset, the system generates a guide feature for guiding the operator to find the target object in the 3D dataset based on another dataset (e.g., a 2D image dataset) obtained for the same environment. The guide feature improves the efficiency and accuracy of the operator to localize the target object in the 3D dataset, and thus reduces the time delay and cost for generating label data characterizing 3D positions of the target objects. Further, since the label data is generated using both the 2D image dataset and the 3D dataset, no further processing is needed to associate labels generated from the 2D image dataset and the 3D dataset.

In another aspect, in some implementations of the provided techniques, instead of loading and rendering a full 3D frame for display and operator interaction, the system can determine a 3D spatial range of interest based on a field of view (FOV) of the 2D image or position data characterizing the 2D positions of the target object (such as a bounding box or a center point labeled on the 2D image), and only generate the rendering of the 3D frame within the 3D spatial range of interest. This process can improve the efficiency and reduce the hardware requirement of the system, and can also improve the efficiency for the operator to locate the target object in the 3D frame since the operator does not need to explore the full 3D range of the 3D frame.

The details of one or more embodiments of the subject matter described in this specification are set forth in the accompanying drawings and the description below. Other features, aspects, and advantages of the subject matter will become apparent from the description, the drawings, and the claims.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 can include one or more cameras, one or more laser sensors, e.g., Lidar sensors, or both. The sensor data 132 can include 2D camera images, 3D point clouds, or data from other types of sensors.

A point cloud generally includes multiple points that represent a sensor measurement of a scene in an environment captured by one or more sensors. Each point has a location in a specified coordinate system, e.g., a three-dimensional coordinate system centered at the sensor, and can optionally be associated with additional features, e.g., intensity, second return, and so on.

As the vehicle 102 navigates through the environment, various sensors capture measurements of the environment. For example, a laser sensor can repeatedly capture point clouds during the navigation.

Once the sensor subsystems 130 generate the sensor data 132, the sensor subsystems 130 can send the sensor data 132 to an object detection system 150, also on-board the vehicle 102.

The object detection system 150 processes the sensor data 132 to generate the detection output 152.

More specifically, the object detection system 150 processes the sensor data, to generate the detection output 152 that includes data characterizing objects detected in the scene. In particular, the object detection system 150 processes sensor data, e.g., one or more camera images, one or more point clouds, or both, using a machine learning model, e.g., an object detection neural network, to generate an output that predicts one or more 3D properties of one or more objects detected in the sensor data. For example, the 3D properties can include one or more of: the depth of the object, i.e., the predicted distance of the object from the camera, the 3D heading of the object relative to the camera or to another fixed point in the environment, or the 3D facing direction of the object relative to the camera or the other fixed point in the environment. The object detection neural network can be configured to process 2D sensor data, 3D sensor data, or both to predict the 3D properties of a target object depicted in the sensor data.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the detection outputs 152 generated by the object detection system 150 to one or more other on-board systems of the vehicle 102, e.g., the planning system 160 and/or a user interface system 165.

When the planning system 160 receives the detection outputs 152, the planning system 160 can use the detection outputs 152 to generate planning decisions that plan a future trajectory of the vehicle, i.e., to generate a new planned vehicle path.

When the user interface system 165 receives the detection outputs 152, the user interface system 165 can use the detection outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102).

The object detection system 150 can obtain the trained parameter values 195, i.e., the trained parameter values of the object detection neural network used by the object detection system 150, from a model parameters store 190 in the training system 120.

The training system 120 is typically hosted within a data center 124, which can be a distributed computing system having hundreds or thousands of computers in one or more locations.

The training system 120 receives raw training examples from vehicles operating in the real world and/or from other sources, e.g., synthetic training examples generated in simulation or training examples generated by sensors on other agents, e.g., robots or other moving agents. For example, the training system 120 can receive raw training examples 155 from the vehicle 102 and one or more other agents that are in communication with the training system 120.

Each raw training example 155 can be processed by the training system 120 to generate a new training example 175. For example, an object label generation system 172 within the training system 120 can process the raw training example 155 to determine a label that identifies one or more 3D properties of the target object and associate the label with the respective first data, the respective second data, or both. The object label generation system 172 and generating the training examples 175 are described below with reference to FIGS. 2-5.

The training data store 170 provides training examples 175 to a training engine 180, also hosted in the training system 120. The training engine 180 uses the training examples 175 to update the parameters of the object detection neural network, and provides the updated model parameters 185 to the model parameters store 190. That is, the training engine 180 trains the object detection neural network on the training examples 175 to minimize a loss function using conventional gradient-based machine learning techniques. For example, the loss function can measure, for each training example 175, the average error, e.g., the average L2 loss, between the predicted motion vector for a given point and the ground truth motion vector for the given point. Once the parameter values of the object detection neural network have been fully trained, the training system 120 can send the trained parameter values 195 to the object detection system 150, e.g., through a wired or wireless connection.

Figure 2:
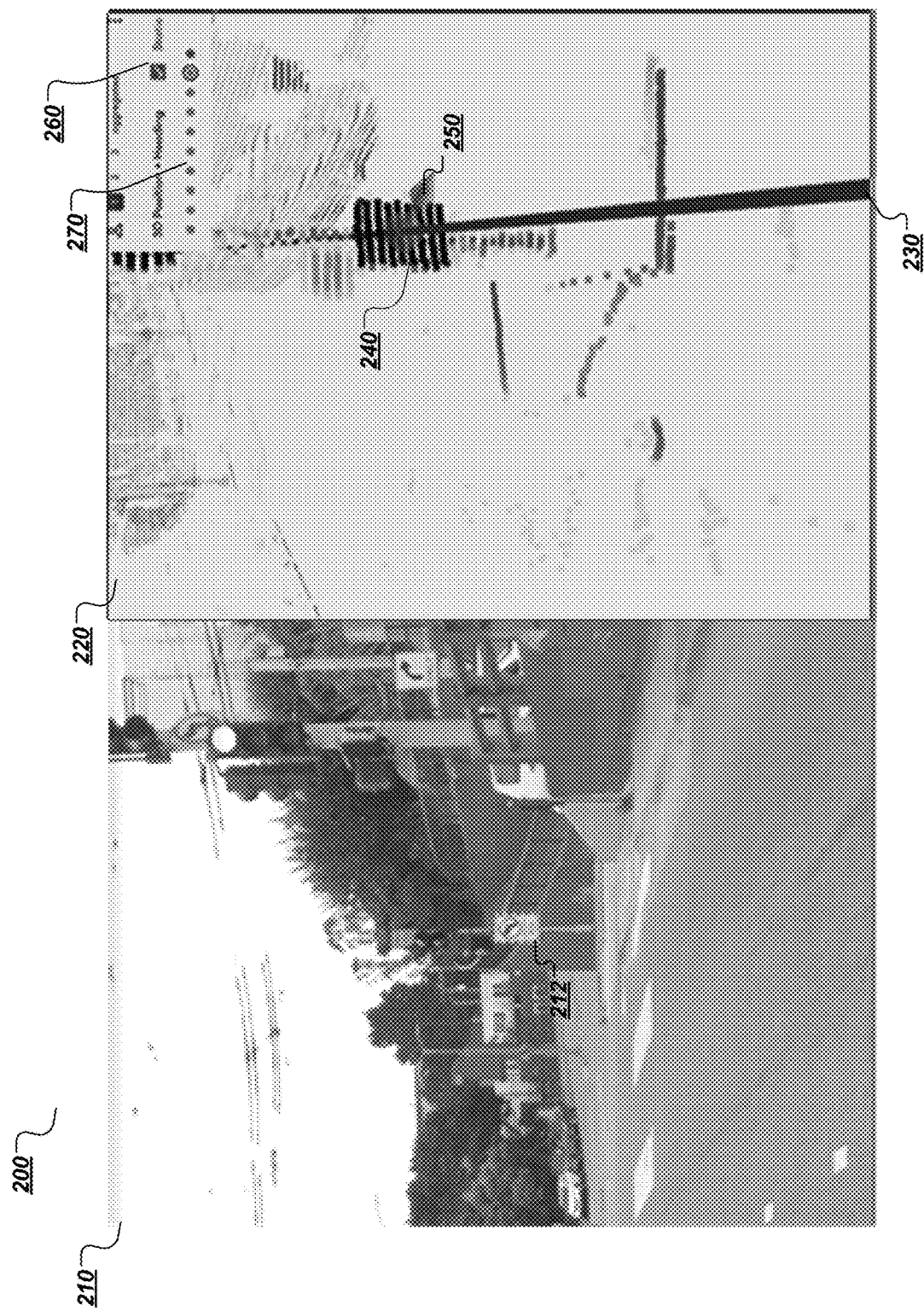
FIG. 2 shows an example user interface generated by a label generation system.

FIG. 2 shows an example of a user interface 200 generated by an object label generation system. The user interface 200 includes a first display area for displaying a 2D image 210, e.g., a 2D camera image. The bounding box 212 for the target object, a road sign in this case, can be marked in the first display area. The user interface 200 further includes a second display area for displaying a rendering of a 3D frame (e.g., a 3D point cloud) 220 and a guide feature 230. The guide feature 230 is a ray generated from mapping the object location (e.g., the center point of the bounding box of the road sign) in the 2D image 210 to the 3D frame.

The user can locate, under the guidance of the guide feature 230, the 3D location of the target object in the 3D frame, and enter the 3D object position via the user interface by placing a dot 240 on the rendering of the 3D frame 220. The user can further enter an arrow 250 to indicate the facing direction of the target object. During the process of locating the target object and entering the position/direction of the target object in the 3D frame, the system user interface allows the user to rotate, zoom, and pan the renderings of the 3D frame 220 and the guide feature 230.

The user interface 200 also allows the user to select, e.g., via the checkbox 260, to indicate whether the target object is a static or a dynamic object. The frame icons (displayed as the dots) 270 are displayed to allow the user to select a particular 3D frame to be displayed, navigated, and labeled.

Figure 3:
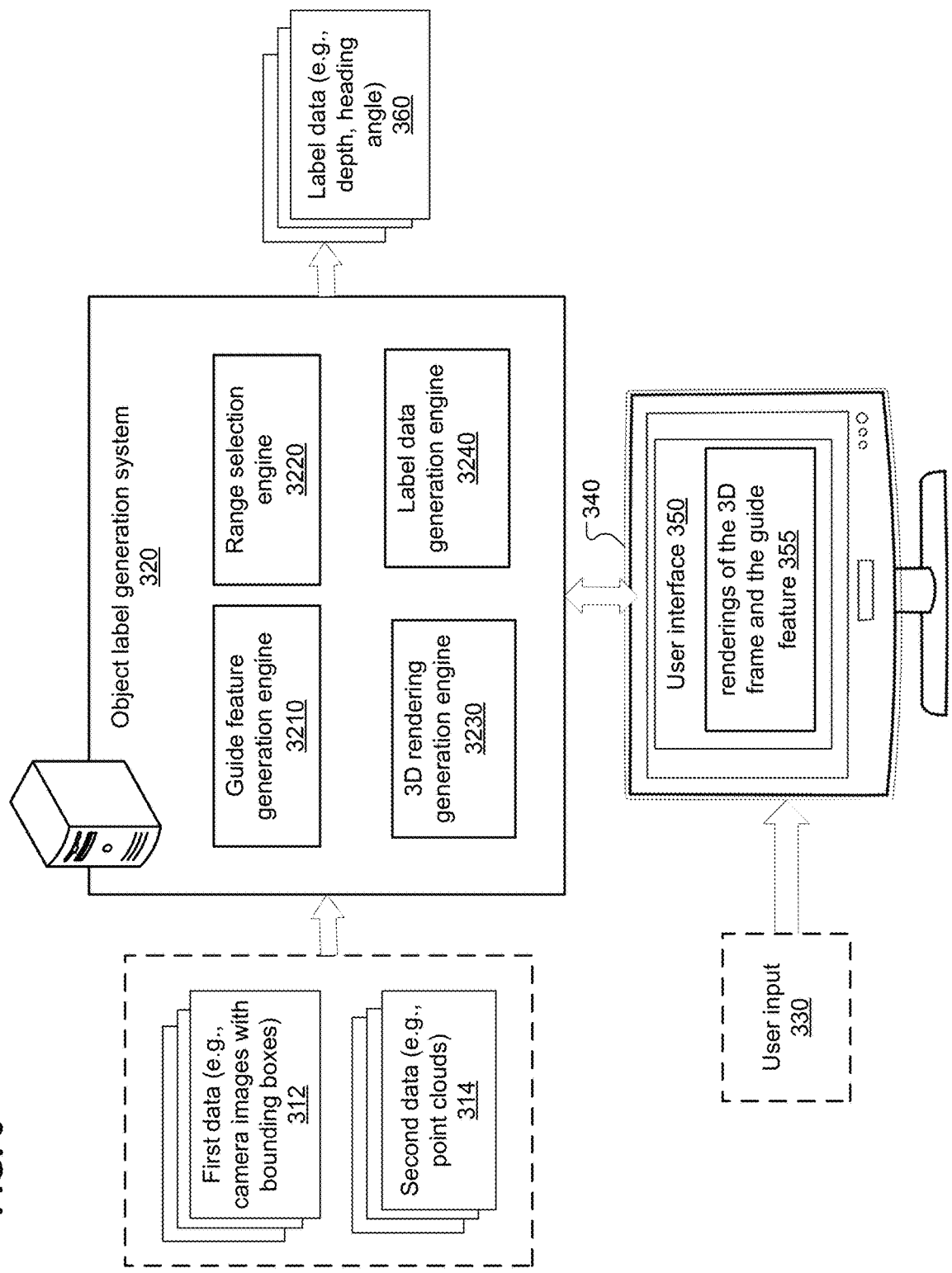
FIG. 3 shows an example object label generation system.

FIG. 3 shows an example of an object label generation system 320. The system 320 is an example of a system implemented as computer programs on one or more computers in one or more locations, in which the systems, components, and techniques described below can be implemented.

In general, the object label generation system 320 generates label data 360 for sensor data. The object label generation system 320 obtains first data 312 and second data 314 characterizing an environment. The first data 312 includes position data characterizing a position of a target object. In some implementations, the position data characterizes the position of the target object in a 2D image.

The first data 312 and second data 314 can be data measured by respective sensors, e.g., sensors configured on a vehicle, in a physical environment.

In one example, the first data 312 includes one or more 2D camera images of the environment and a respective bounding box that marks the position and geometry of the target object in each respective 2D camera image. The position data (e.g., the bounding box of the target object) can be obtained via manual labeling, e.g., created and entered into a computer system by human operators through a user interface. The position data can also be obtained by using a computer system (e.g., the system 320 or another system) to perform a 2D object detection algorithm.

While this specification describes the position data of the target object in the 2D camera image as being bounding boxes, other types of data that mark the position and geometry of an object in an image frame can be used instead. One example of another type of position data is a set of key points. The key points can be points in the 2D image that mark features (e.g., a corner or a point on the outer boundary) of the target object in the 2D image.

In another example, the first data 312 can include a map of the environment and the position coordinates (e.g., GPS latitude and longitude coordinates) or other position identifiers for the target object. In both examples above, the position data characterizes the position of the target object in two dimensions (e.g., in the two dimensions of the camera image plane or the map plane).

The second data 314 includes one or more 3D frames characterizing the environment. For example, the 3D frame can be a 3D point cloud captured at a particular time point by a Lidar sensor of the environment. The second data 314 can include a sequence of 3D frames captured at a plurality of time points.

The system 320 includes a guide feature generation engine 3210 to generate a guide feature for guiding a user to navigate the 3D frame to locate the target object in the 3D frame. In particular, the guide feature generation engine 3210 determines the guide feature based on the first data 312. For example, when the first data 312 includes a 2D camera image and a bounding box or a set of key points that mark the position and geometry of the target object in the 2D camera image, the guide feature generation engine 3210 can identify a center point of the target object in the 2D camera image plane. The identified center point in the 2D plane corresponds to a ray in the 3D space of the 3D frame, where any point on the ray corresponds to the 2D position of the center point in the 2D plane.

In one example, the guide feature generation engine 3210 maps the identified center point in the 2D image plane to the ray in the 3D frame based on camera pose parameters (e.g., the 3D position and the facing direction) of the camera and a camera imaging model of the camera that maps each 2D point in the camera image plane to 3D positions.

In another example, to generate the guide feature (e.g., the ray) in the 3D frame based on a given center point in the 2D image, the guide feature generation engine 3210 maps the center point from the 2D image into the 3D frame based on calibration data between the camera sensor that captured the 2D image and the sensor (e.g., a Lidar sensor) that captured the 3D frame. The calibration data can be generated based on, e.g., a calibration between the camera that captures the images and the Lidar sensor that captures the point clouds.

As a particular example, the system 320 can maintain calibration data for the camera sensor and calibration data for the Lidar sensor. The calibration data for the Lidar sensor maps points in the coordinate system of the Lidar sensor to coordinates in a shared coordinate system, e.g., coordinates in a vehicle coordinate system that is centered at the vehicle if both sensors are on the same vehicle or coordinates in a vehicle coordinate system that is centered at the vehicle on which the camera sensor is deployed if the two sensors are on different vehicles. The calibration data for the camera sensor maps points in the shared coordinate system to points in an image coordinate system, i.e., the 3D coordinate system within images captured by the camera sensor. By using this calibration data, the guide feature generation engine 3210 can map a point in the 2D image generated by the camera sensor from the coordinate system of the camera sensor to the shared coordinate system and then to the image coordinate system of the Lidar sensor.

The system 320 further includes a 3D rendering generation engine 3230 configured to generate a rendering 355 that includes a rendering of at least a portion of a selected 3D frame and a rendering of the guide feature (e. g., a ray).

The system 320 is configured to display the rendering 355 via a user interface 350 that includes, for example, a display screen. The rendering 355 can be displayed as an overlay of the rendering of the selected 3D frame and the rendering of the guide feature. Since the guide feature can mark the possible 3D locations of the target object, the displayed rendering of the guide feature assists a user to focus efforts on a specific region of the 3D frame where the target object is located.

In some implementations, the system 320 can receive a user input 330 through the user interface 350 for adjusting the rendering 355 to be displayed. For example, based on the user input 330, the system can zoom in, zoom out, rotate, or pan the displayed rendering 355 to assist the user to navigate in the 3D frame. In general, the user can interact with the system 320 through the interface 350 using an input device. Examples of the input device include a keyboard, a mouse or a trackball, a touchpad, a touch screen, a microphone for receiving voice commands, a visual sensor for receiving gesture commands, and so on. The input device can receive the user inputs and send the user to the system 320.

In some implementations, when the second data 314 include a sequence of 3D frames, e.g., 3D frames captured at a plurality of time points (e.g., according to multiple timestamps of the sensor), the user input 330 can indicate a selection of the 3D frames to be displayed through the user interface 350. For example, the user interface 350 can display an interactive element such as a scroll bar or a list of icons for the user to select the 3D frame to be displayed.

In some implementations, the system 320 performs a pre-selection of a set of candidate 3D frames from the second data 314 to present 3D frames that are most suitable for the user to navigate to locate the target object. For example, the system 320 can perform an analysis for the sequence of 3D frames and exclude 3D frames in which the target object is occluded from the view or 3D frames having inadequate data points.

In some implementations, the system 320 further includes a range selection engine 3220 for determining a 3D spatial range of interest for the 3D frame. In one example, the range selection engine 3220 can determine the 3D spatial range of interest based on a field of view of the 2D camera image. The field of view of the 2D camera image can be mapped to a particular region, e.g., a cone-shaped or wedge-shaped region in the 3D space. Any locations outside the particular region in the 3D frame may not be of interest because they are outside the field of view of the camera image and thus do not depict features of the target object (assuming that the target object is fully shown in the 2D camera image).

In another example, the range selection engine 3220 can determine the 3D spatial range of interest based on the position data (e.g., the bounding box of the target object) provided in the first data 312. The range selection engine 3220 can map an area that encompasses the bounding box of the target object in the 2D image to a particular region in the 3D space. Any locations outside the particular region in the 3D frame may not be of interest because they are away from object positions corresponding to the target object.

Once the 3D spatial range of interest is determined, the rendering generation engine 3230 can generate the rendering for only a portion of the selected 3D frame that is within the 3D spatial range of interest. By rendering and displaying only the portion of the 3D frame within the range of interest, the efficiency of the system 320 can be improved. The efficiency for the user to locate the target object in the 3D frame is also improved since the user does not need to navigate the full 3D range of the 3D frame to locate the target object.

Figure 4:
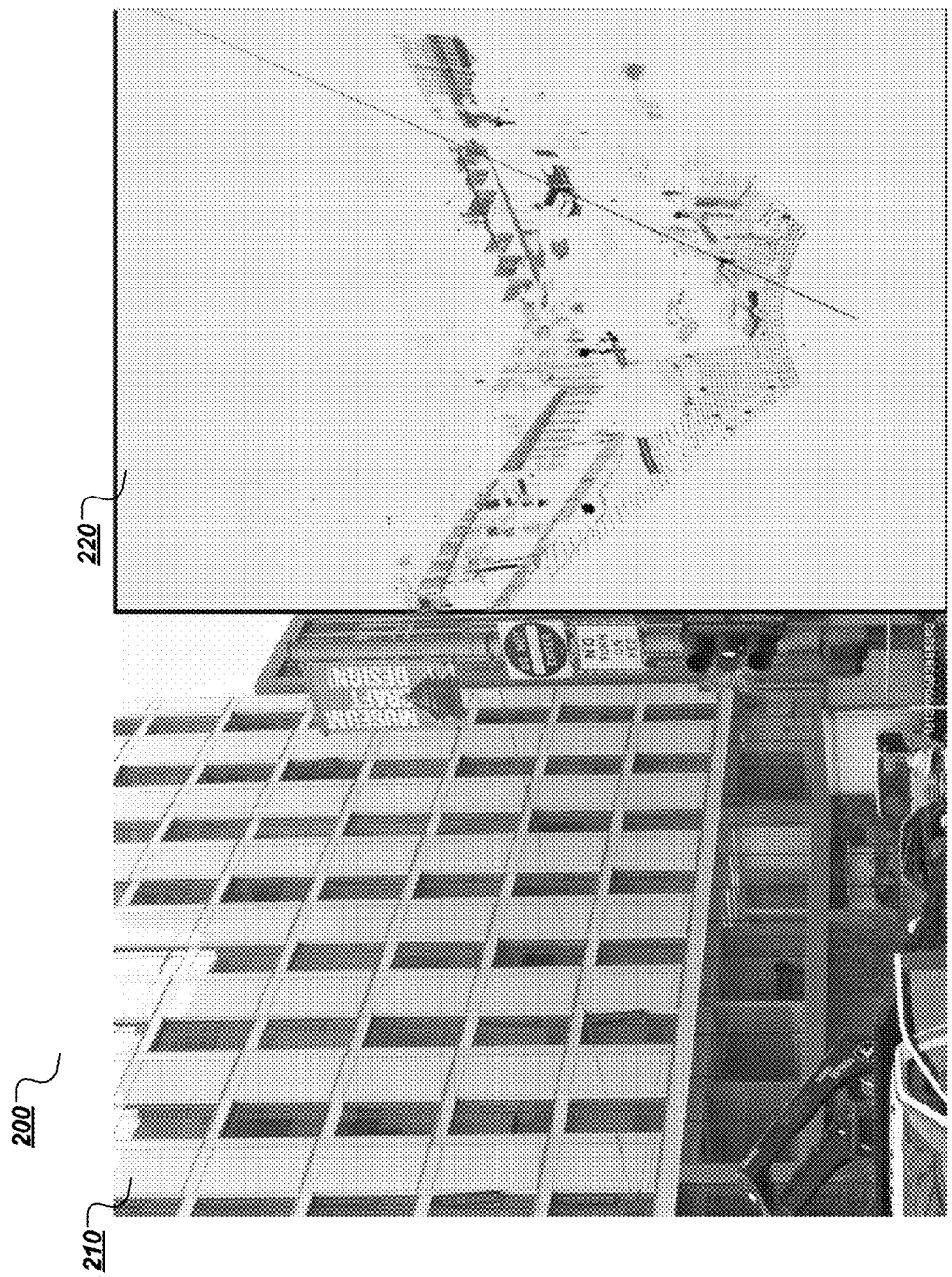
FIG. 4 shows another example user interface generated by a label generation system.

FIG. 4 shows another example of the user interface 200 to illustrate the displayed portion of the 3D frame that is within the 3D spatial range of interest. The first display area displays a 2D camera image 210. The second display displays the portion of the 3D frame 220 that is within the 3D spatial range of interest. As shown in FIG. 4, the displayed portion of the 3D frame can be a wedge-shaped 3D region.

Referring back to FIG. 3, after displaying the 3D frame and the guiding feature, the system 320 receives the user input 330 to specify one or more 3D properties of the target object in the 3D frame. For example, the user can select, via the user interface and based on the displayed 3D spatial features of the 3D frame, a point along or near the displayed rendering of the guiding feature (e.g., the ray). The point corresponds to a 3D position in the 3D frame, e.g., the position of the 3D center point of the target object in the 3D frame as identified by the user. In some implementations, the user input 330 can further specify an object direction of the target object in the selected 3D frame, e.g., by repositioning an arrow overlaying the displayed rendering of the 3D frame. The object direction can be a heading direction (e.g., of a vehicle or a wheel of a vehicle) or a facing direction (e.g., of a road sign) that characterizes the orientation of the target object.

In some implementations, the object direction annotation can be optional. For example, the system 320 can receive a user input for indicating that the object heading direction cannot be annotated, for example, via an interactive element (e.g., a button, a switch, or a checkbox) displayed on the user interface. The system 320 can display a status of the object heading direction as missing.

The system 320 further includes a label data generation engine 3240. Based on the user input 330, e.g., based on the object position and/or the object direction specified by the user input 330, the label data generation engine 3240 generates label data 360 for labeling the features of the target object. In an example implementation, the label data generation engine 3240 can translate the 3D position identified by the user input in the 3D frame to a distance of the target object from the camera. In another example implementation, the label data generation engine 3240 can translate the object direction identified by the user input in the 3D frame to an angle value (e.g., an angle from a true north direction).

The label data 360 can include a depth value characterizing the distance of the target object determined from the 3D object position and an angle value of the target direction (e.g., heading or facing direction of the target). The generated label data 360 can supplement the position data included in the first data (e.g., the 2D bounding box in the 2D image) and provide 3D position information of the target object.

In some implementations, when the second data 314 include a sequence of 3D frames, e.g., 3D frames captured at a plurality of time points, the system 320 can determine whether the target object is a static object or a dynamic object in the sequence of 3D frames. If the system 320 determines that the target object is a static object, the system 320 can copy the label data 360 that has been generated for the selected 3D by the label data generation engine 3240 to additional 3D frames in the second data 314 because the object position and direction of the target object remain constant among different 3D frames. This feature further improves the efficiency of the labeling process.

In some implementations, the system 320 determines whether the target object is static based on a user selection. For example, the system 320 can allow the user to select whether the target object is static, for example, via an interactive element (e.g., a button, a switch, or a checkbox) displayed on the user interface. In some implementations, the system 320 can perform a target analysis based on the first data to determine whether the target object is static. For example, when the sensors that have generated the first data 312 and the second data 314 were located in a fixed location during observation, the system 320 can make the determination based on the type of target object, e.g., whether the target object is an object that typically has a fixed location (e.g., a road sign) or an object that can be moving (e.g., a sign attached to a vehicle).

Figure 5:
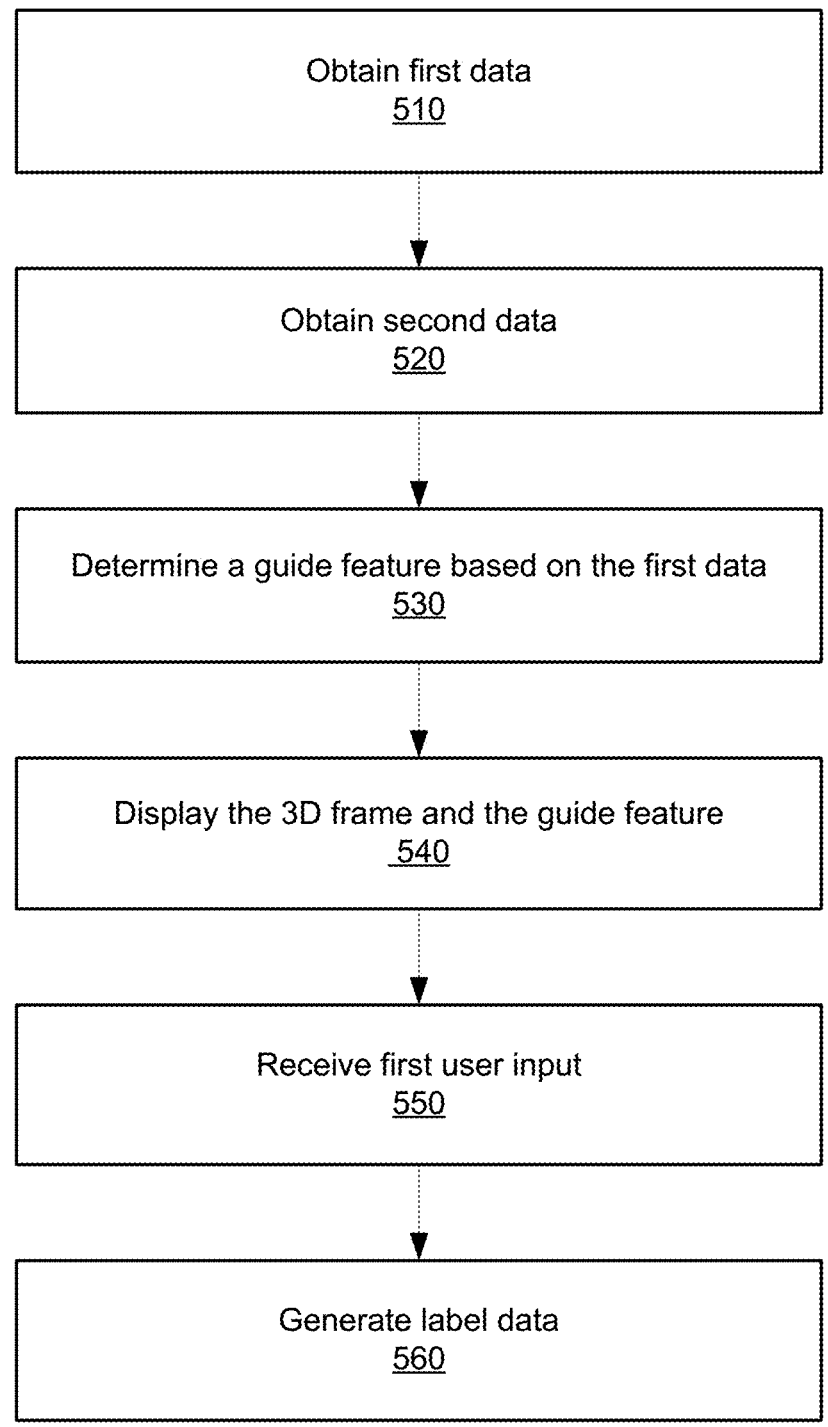
FIG. 5 is a flow diagram illustrating an example process for generating object label data.

FIG. 5 is a flow diagram illustrating an example process 500 for generating object data for a target object in an environment. For convenience, the process 500 will be described as being performed by a system of one or more computers located in one or more locations. For example, an object label generation system, e.g., the object label generation system 320 of FIG. 3, appropriately programmed in accordance with this specification, can perform the process 500.

In step 510, the system obtains first data characterizing the environment. The first data includes position data characterizing a position of the target object. In step 520, the system obtains second data including one or more three-dimensional (3D) frames characterizing the environment. In step 530, the system determines, based on the first data, a guide feature for locating the target object in the 3D frames of the second data. In step 540, the system displays, via a user interface, a rendering of at least a portion of a selected 3D frame in the second data, and displays a rendering of the guide feature as an overlay on the rendering of the selected 3D frame. In step 550, the system receives a first user input that specifies at least an object position in the selected 3D frame. In step 560, the system generates label data for the target object based on the first user input.

This specification uses the term "configured" in connection with systems and computer program components. For a system of one or more computers to be configured to perform particular operations or actions means that the system has installed software, firmware, hardware, or a combination of them that cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claim is:

1. A computer-implemented method for labeling a target object in an environment, comprising:
    obtaining first data characterizing the environment, wherein the first data includes position data characterizing a position of the target object;
    obtaining second data including one or more three-dimensional (3D) frames characterizing the environment;
    determining, based on the first data, a guide feature for locating the target object in the 3D frames of the second data;
    displaying, in a user interface, (i) a rendering of at least a portion of a selected 3D frame in the second data, and (ii) a rendering of the guide feature as an overlay on the rendering of the selected 3D frame;
    receiving a first user input that specifies at least an object position in the selected 3D frame; and
    generating label data for the target object based on the first user input.

2. The method of claim 1, wherein each of the one or more 3D frames is a 3D point cloud generated from sensor readings of the environment by one or more sensors.

3. The method of claim 1, wherein the label data includes a depth value of the target object, and generating the label data includes determining the depth value of the target object based on the object position specified by the first user input.

4. The method of claim 3, wherein:
    the first user input further specifies an object direction of the target object in the selected 3D frame; and
    the label data further includes data characterizing the object direction of the target object.

5. The method of claim 4, wherein the data characterizing the object direction of the target object includes a heading angle of the target object.

6. The method of claim 1, wherein the first data include a two-dimensional (2D) image of the environment captured by a camera.

7. The method of claim 6, wherein the position data characterizing the position of the target object defines a bounding box or a set of key points marking a position and geometry of the target object in the 2D image.

8. The method of claim 7, further comprising:
    before displaying the rendering of the at least a portion of the selected 3D frame, determining, a 3D spatial range of interest within the selected 3D frame based on one or more of: a field of view of the 2D image or the position data;
    wherein the rendering of the at least a portion of the selected 3D frame is generated for the portion of the selected 3D frame that is within the 3D spatial range of interest.

9. The method of claim 7, wherein determining the guide feature comprises:
    determining a center point of the target object in the 2D image; and
    determining the guide feature as a ray in the 3D frame corresponding to the center point of the target object in the 2D image.

10. The method of claim 1, wherein:
    the second data includes a plurality of 3D frames captured at a plurality of time points; and the method further comprises:
    receiving a second user input to select a time point; and
    displaying, via the user interface, the 3D frame captured at the selected time point.

11. The method of claim 10, wherein the label data include a label for each of the plurality of respective time points.

12. The method of claim 11, further comprising:
    determining whether the target object is a static object or a dynamic object; and
    in response to determining that the target object is a static object, copying the label data that has been generated for the selected 3D frame to label data for additional 3D frames in the second data.

13. A system comprising one or more computers and one or more storage devices storing instructions that are operable, when executed by the one or more computers, to cause the one or more computers to perform labeling a target object in an environment, comprising:

obtaining first data characterizing the environment, wherein the first data includes position data characterizing a position of the target object;

obtaining second data including one or more three-dimensional (3D) frames characterizing the environment;

determining, based on the first data, a guide feature for locating the target object in the 3D frames of the second data;

displaying, in a user interface, (i) a rendering of at least a portion of a selected 3D frame in the second data, and (ii) a rendering of the guide feature as an overlay on the rendering of the selected 3D frame;

receiving a first user input that specifies at least an object position in the selected 3D frame; and generating label data for the target object based on the first user input.

14. The system of claim 13, wherein each of the one or more 3D frames is a 3D point cloud generated from sensor readings of the environment by one or more sensors.

15. The system of claim 13, wherein the label data includes a depth value of the target object, and generating the label data includes determining the depth value of the target object based on the object position specified by the first user input.

16. The system of claim 15, wherein:
the first user input further specifies an object direction of the target object in the selected 3D frame; and
the label data further includes data characterizing the object direction of the target object.

17. The system of claim 16, wherein the data characterizing the object direction of the target object includes a heading angle of the target object.

18. The system of claim 13, wherein the first data include a two-dimensional (2D) image of the environment captured by a camera.

19. A non-transitory computer storage medium encoded with instructions that, when executed by one or more computers, cause the one or more computers to perform labeling a target object in an environment, comprising:

obtaining first data characterizing the environment, wherein the first data includes position data characterizing a position of the target object;

obtaining second data including one or more three-dimensional (3D) frames characterizing the environment;

determining, based on the first data, a guide feature for locating the target object in the 3D frames of the second data;

displaying, in a user interface, (i) a rendering of at least a portion of a selected 3D frame in the second data, and (ii) a rendering of the guide feature as an overlay on the rendering of the selected 3D frame;

receiving a first user input that specifies at least an object position in the selected 3D frame; and generating label data for the target object based on the first user input.

20. The computer storage medium of claim 19, wherein each of the one or more 3D frames is a 3D point cloud generated from sensor readings of the environment by one or more sensors.

* * * * *